United States Patent
Mergen et al.

(10) Patent No.: US 10,361,860 B2
(45) Date of Patent: Jul. 23, 2019

(54) METHOD AND APPARATUS FOR AUTHENTICATION AND VALIDATION OF PERSONS USING GAIT DATA

(71) Applicant: RAYTHEON BBN TECHNOLOGIES CORP., Cambridge, MA (US)

(72) Inventors: John-Francis Mergen, Baltimore, MD (US); Zachary Leuschner, Annapolis, MD (US); Matthew Thomas Carr, Baltimore, MD (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 258 days.

(21) Appl. No.: 15/268,483

(22) Filed: Sep. 16, 2016

(65) Prior Publication Data
US 2018/0083783 A1 Mar. 22, 2018

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06K 9/00348* (2013.01);
(Continued)

(58) Field of Classification Search
CPC ......... H04L 9/3231; H04L 9/006; H04L 9/14; H04L 9/30; H04L 9/3247; H04L 63/0428;
(Continued)

(56) References Cited

U.S. PATENT DOCUMENTS

| 9,826,400 B2* | 11/2017 | Jakobsson | G06F 21/35 |
| 2017/0035327 A1* | 2/2017 | Yuen | G06F 3/017 |
| 2017/0197115 A1* | 7/2017 | Cook | A63B 26/003 |

FOREIGN PATENT DOCUMENTS

| CN | 101695445 A | 4/2010 |
| WO | WO 2004/040501 A1 | 5/2004 |

OTHER PUBLICATIONS

Boulgouris, Nikolaos V. et al., "Gait Recognition: A challenging signal processing technology for biometric identification", IEEE Signal Processing Magazine, Nov. 2005, pp. 78-90.
(Continued)

*Primary Examiner* — Kambiz Zand
*Assistant Examiner* — Arezoo Sherkat
(74) *Attorney, Agent, or Firm* — Lewis Roca Rothgerber Christie LLP

(57) ABSTRACT

A system for authentication and validation of the identity of a person. The person carries a mobile device configured to measure motion as the person walks or stands still, generating a time record of motion data. A security system in a facility which the person seeks to access receives the time record of motion data and compares gait characteristics inferred from the time record with gait characteristics inferred from motion data previously obtained for a person whom the person seeking access purports to be. The security system may instruct the person to pause and stand still, and then to begin walking again, and it may then verify that the received time record of motion data includes an interval with little motion at a point in the time record corresponding to the pause.

15 Claims, 4 Drawing Sheets

(51) Int. Cl.
*H04L 29/06* (2006.01)
*H04W 12/04* (2009.01)
*G07C 9/00* (2006.01)
*H04W 12/02* (2009.01)
*H04W 12/06* (2009.01)
*G06K 9/00* (2006.01)
*G06K 9/62* (2006.01)

(52) U.S. Cl.
CPC ........ *G06K 9/00885* (2013.01); *G06K 9/6211* (2013.01); *G07C 9/00* (2013.01); *G07C 9/00087* (2013.01); *H04L 9/3247* (2013.01); *H04L 63/0428* (2013.01); *H04L 63/06* (2013.01); *H04L 63/0861* (2013.01); *H04W 12/02* (2013.01); *H04W 12/04* (2013.01); *H04W 12/06* (2013.01); *G07C 2009/00095* (2013.01)

(58) Field of Classification Search
CPC .... H04L 63/06; H04L 63/0861; H04W 12/02; H04W 12/04; H04W 12/06; G06F 21/32; G06K 9/00348; G07C 9/00; G07C 9/00087; G07C 9/00095
See application file for complete search history.

(56) References Cited

OTHER PUBLICATIONS

Nickel, Claudia et al., "Classification of Acceleration Data for Biometric Gait Recognition on Mobile Devices", Hochschule Darmstadt—CASED, Darmstadt, Germany, Sep. 8, 2011, pp. 57-66.

* cited by examiner

METHOD AND APPARATUS FOR AUTHENTICATION AND VALIDATION OF PERSONS USING GAIT DATA

BACKGROUND

1. Field

One or more aspects of embodiments according to the present invention relate to identification, and more particularly to a system and method for authenticating a person's identity based on the person's gait.

2. Description of Related Art

In numerous commercial and military situations it may be useful to authenticate and validate a person's identity. Corporations (such as large banks) or agencies may require authentication of people regularly accessing a facility. Force protection may be employed in locations where persons approaching a checkpoint are authenticated or validated before they are close enough to cause harm. For example, at a checkpoint with a remote control gate located before the checkpoint, if a persons approaching is not validated, the person may automatically be denied entry, to provide a level of protection from carried explosives. In environments in which naturally porous boundaries (e.g., a loading dock or transshipment facility) in which there is a possibility of theft from unauthorized access, it may be advantageous to use validation to verify the identities of those entering and exiting during the course of a work day. Related art systems for authentication and validation may be burdensome or vulnerable to falsification. Moreover, some biometric systems require that a person be isolated, e.g., to obtain a fingerprint or to perform facial recognition, for authentication and validation. This too may be burdensome or inconvenient.

Thus, there is a need for an improved system and method for authentication and validation.

SUMMARY

Aspects of embodiments of the present disclosure are directed toward a system for authentication and validation of the identity of a person. The person carries a mobile device configured to measure motion as the person walks or stands still, generating a time record of motion data. A security system in a facility which the person seeks to access receives the time record of motion data and compares gait characteristics inferred from the time record with gait characteristics inferred from motion data previously obtained for a person whom the person seeking access purports to be. The security system may instruct the person to pause and stand still, and then to begin walking again, and it may then verify that the received time record of motion data includes an interval with little motion at a point in the time record corresponding to the pause.

According to an embodiment of the present invention there is provided a method for identifying a person, the method including: instructing the person to walk, if the person is not already walking; instructing the person to stop during an interval of time; instructing the person to begin walking again; receiving a time record of motion data generated by a motion sensing instrument carried by the person; determining whether a measure of any differences between: the time record of motion data, and previously recorded motion data is less than a first threshold; and determining whether the time record of the motion data includes a segment, corresponding to the interval of time, within which an amount of motion is less than a second threshold.

In one embodiment, the method includes receiving purported identifying information for the person.

In one embodiment, the method includes: granting access to a facility when: the received purported identifying information matches identifying information for a person for whom the previously recorded motion data was recorded and who is authorized to access the facility; the measure of any differences between: the time record of motion data, and the previously recorded motion data is less than the first threshold ; and the time record of the motion data includes a segment, corresponding to the interval of time, within which an amount of motion is less than the second threshold.

In one embodiment, the receiving of the time record of motion data includes receiving an encrypted time record of motion data.

In one embodiment, the receiving of the time record of motion data includes receiving a cryptographically signed time record of motion data.

In one embodiment, the receiving of the cryptographically signed time record of motion data includes receiving a time record of motion data cryptographically signed utilizing a public key infrastructure (PKI).

In one embodiment, the motion sensing instrument includes a plurality of sensors.

In one embodiment, the plurality of sensors includes an accelerometer.

In one embodiment, the plurality of sensors further includes a rotation sensor.

In one embodiment, the comparing of the time record of motion data to the previously recorded motion data includes: fitting a parameterized model to the time record of motion data to obtain a first vector of parameter values fitting the parameterized model to the previously recorded motion data to obtain a second vector of parameter values; and calculating a vector difference between the first vector and the second vector.

In one embodiment, the calculating of the vector difference between the first vector and the second vector includes finding the largest one of a set of absolute values of element-by-element differences between the first vector and the second vector.

According to an embodiment of the present invention there is provided a system for authenticating the identity of a person, the system including: a mobile device including: a motion sensing instrument; a mobile device control circuit; and a wireless communications circuit, the mobile device control circuit being configured to: instruct a person carrying the mobile device to begin a first interval of walking, if the person is not already walking, instruct the person to stop during an interval of time; instruct the person to begin a second interval of walking; receive a plurality of signals from the motion sensing instrument; generate a time record of motion data from the received signals; and transmit the time record of motion data through the wireless communications circuit.

In one embodiment, the mobile device control circuit is further configured to, before instructing the person to begin the first interval of walking: receive an encrypted token through the wireless communications circuit; decrypt the encrypted token to form a decrypted token; and compare the decrypted token to a reference token stored in the mobile device.

In one embodiment, the mobile device control circuit is further configured to encrypt the time record of motion data to form an encrypted time record of motion data, and wherein the transmitting of the time record of motion data includes transmitting the encrypted time record of motion data.

In one embodiment, the system further includes: a controllable barrier for controlling access to a facility; and a facility control circuit; the facility control circuit being configured to: receive the encrypted time record of motion data; decrypt the encrypted time record of motion data to form a decrypted time record of motion data; and determine whether a measure of any differences between: the time record of motion data, and previously recorded motion data is less than a first threshold.

In one embodiment, the facility control circuit is further configured to: determine whether the time record of the motion data includes a segment, corresponding to the interval of time, within which an amount of motion is less than a second threshold.

In one embodiment, the facility control circuit is further configured to: open the barrier when: the measure of any differences between: the time record of motion data, and the previously recorded motion data is less than the first threshold ; and the time record of the motion data includes a segment, corresponding to the interval of time, within which an amount of motion is less than the second threshold.

In one embodiment, the mobile device control circuit is further configured to encrypt a mobile device token with a private encryption key to form an encrypted mobile device token, and the facility control circuit is further configured to: decrypt the encrypted mobile device token to form a decrypted mobile device token; and determine whether the decrypted mobile device token is the same as a reference token stored in the facility.

In one embodiment, the facility control circuit is further configured to: open the barrier when: the measure of any differences between: the time record of motion data, and previously recorded motion data is less than the first threshold; the time record of the motion data includes a segment, corresponding to the interval of time, within which an amount of motion is less than the second threshold; and the decrypted mobile device token is the same as the reference token.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method and apparatus for authentication and validation of persons using gait data provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Walking gait, i.e., the gate of a person walking, may vary from person to person and be sufficiently distinctive and reproducible to be useful for identifying the person. In some embodiments, a portable device, such as a mobile phone, carried by a person, is used to characterize the walking gait of a person carrying it, and to authenticate and validate the purported identity of the person carrying it.

Figure 1:
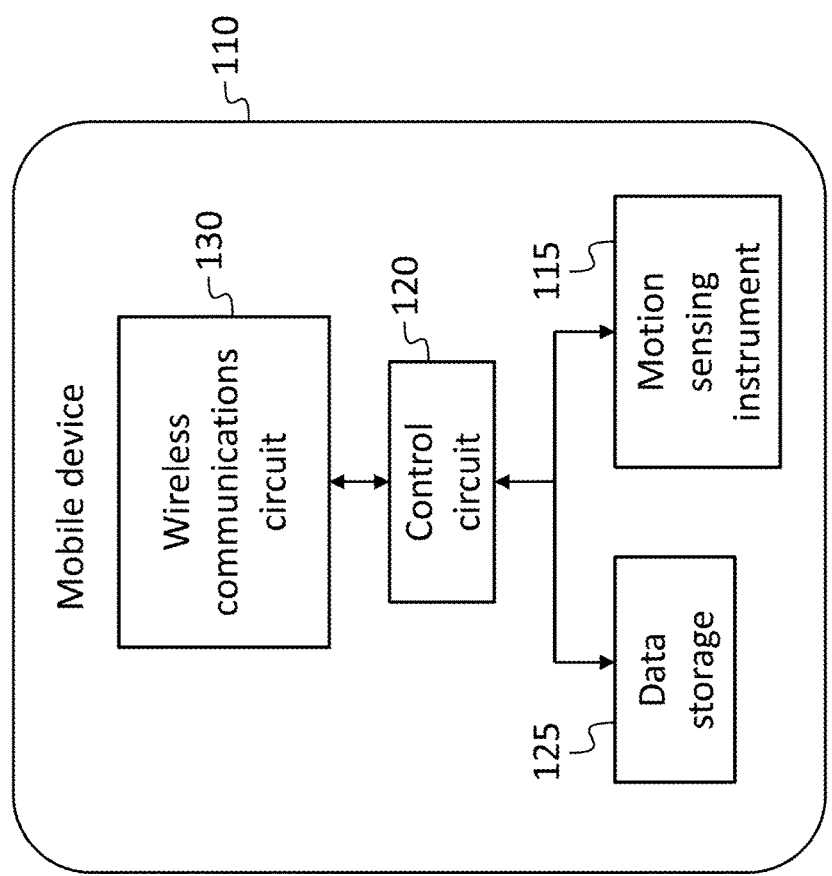
FIG. 1 is a block diagram of a mobile device, according to an embodiment of the present invention.

Referring to FIG. 1, in some embodiments a mobile device 110, such as a mobile phone, or certain watches or fitness accessories, may include a motion sensing instrument 115 for sensing the motion of the mobile device 110 (and of the person carrying it). The mobile device 110 may further include a mobile device control circuit 120, a data storage element 125, and a mobile device wireless communications circuit 130.

Figure 2:
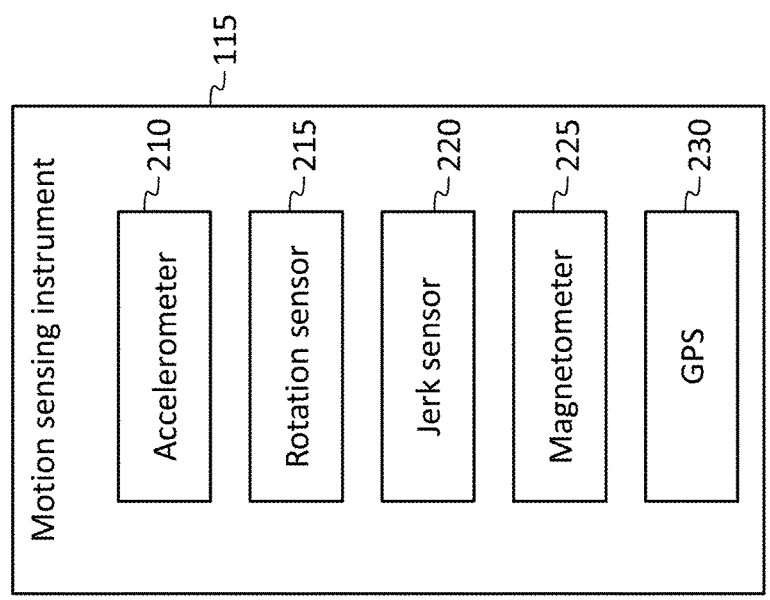
FIG. 2 is a block diagram of a motion sensing instrument, according to an embodiment of the present invention.

Referring to FIG. 2, in one embodiment the motion sensing instrument 115 includes a plurality of sensors including one or more accelerometers 210, rotation sensors 215, jerk sensors 220, compasses or "magnetometers" 225, and a Global Positioning System (GPS) receiver 230. The sensors may be rigidly secured to the frame or enclosure of the mobile device 110 and accordingly may share a frame of reference, which may be referred to as the frame of reference of the motion sensing instrument 115. Each accelerometer may measure an acceleration (which may be the acceleration of the mobile device if the acceleration of the mobile device is uniform) plus the force of gravity. Each jerk sensor may measure a rate of change of acceleration. Each rotation sensor may measure angular rate (e.g., if the rotation sensor is a gyroscope, such as a microelectromechanical systems (MEMS) gyroscope), or it may measure angular acceleration, e.g., if it is a balanced weight accelerometer. Each magnetometer may measure the local magnetic field.

Each of the above-listed sensors may be a single-axis sensor measuring one component of the vector quantity being measured (e.g., one component (along a direction defined by the orientation of a one-axis accelerometer) of the acceleration (which is a vector quantity)), or it may be a multi-axis sensor, e.g., a three axis sensor, capable of measuring both the magnitude and direction of the quantity (e.g., the acceleration) being sensed. In one embodiment a plurality of spatially separated accelerometers is used to measure angular rate by finding a combination of linear accelerations, gravity, and centripetal accelerations that fit the respective accelerations measured by the accelerometers.

The output of the motion sensing instrument may be one or more signals, or data streams, in analog and/or digital format. These signals or data streams may be received by the mobile device control circuit 120, which may include analog to digital converters to convert to digital signals (i.e., digital data streams) any signals produced in analog form by the motion sensing instrument 115.

Figure 3:
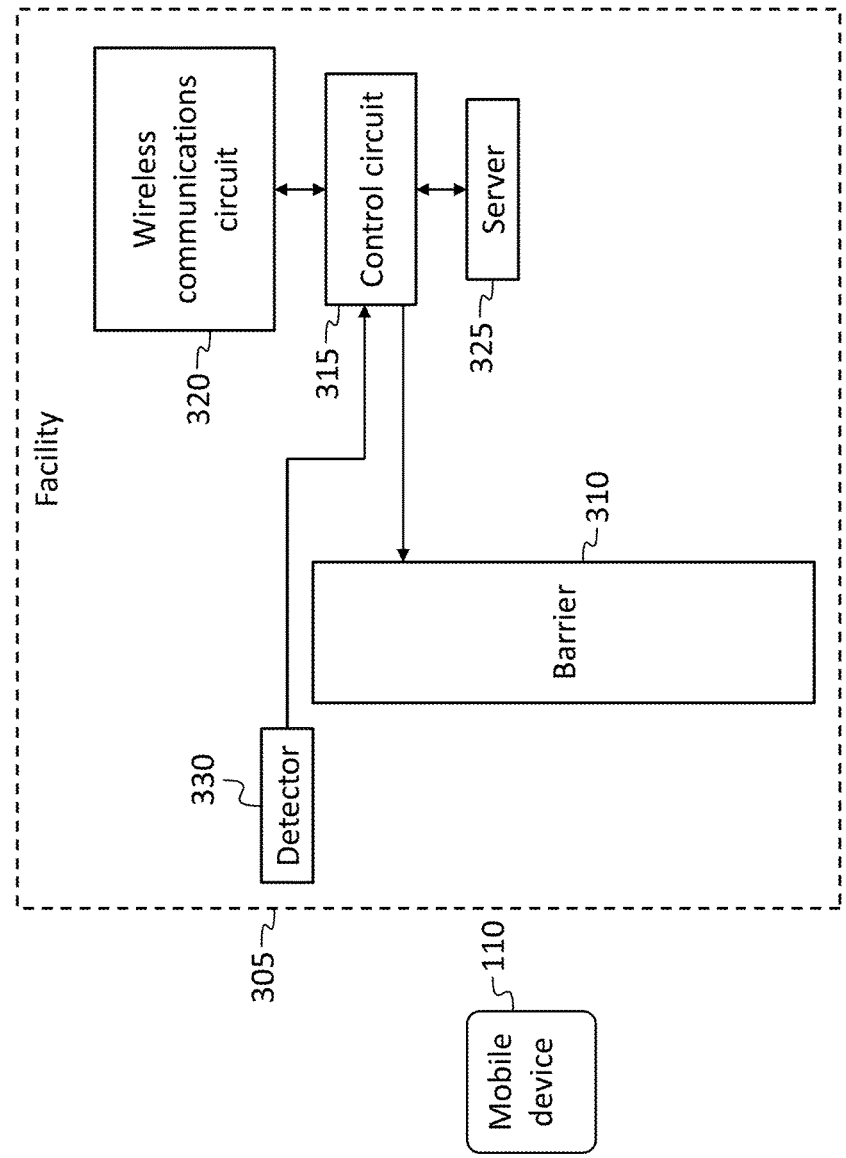
FIG. 3 is a block diagram of a facility, according to an embodiment of the present invention.

Referring to FIG. 3, in one embodiment a facility 305 access to which is to be controlled may include a barrier 310, which is controlled by a facility access control circuit 315, a facility wireless communications circuit 320 connected to the facility access control circuit 315, and a server 325, also connected to the facility access control circuit 315. The barrier 310 may be a locked door, that may be unlocked (e.g., remotely, through an electrical or wireless control circuit) or locked by the facility access control circuit 315. In other embodiments the barrier 310 may be a barricade configured, when closed, to prevent passage of a vehicle, or the barrier 310 may be a human guard whom the facility access control circuit 315 may instruct to allow a person to enter the facility 305, or deny access to the person.

In one embodiment, in operation, a person approaching, e.g., walking toward, the barrier 310 carries a mobile device 110, and the facility access control circuit 315 communicates with the mobile device control circuit 120, e.g., through the facility wireless communications circuit 320 and the mobile device wireless communications circuit 130. As the person walks, the motion sensing instrument 115 measures motion and orientation, e.g., accelerations, rotations, magnetic field directions, and the like. These measurements may include data from all of the sensors of the motion sensing instrument 115 and are referred to herein as "motion data". The motion data may be related to characteristics of the walking gait of the person.

The mobile device control circuit 120 receives the motion data, and transmits the motion data, along with purported identifying information for the person, to the facility access control circuit 315, e.g., through the facility wireless communications circuit 320 and the mobile device wireless communications circuit 130.

The purported identifying information of the person may include, for example, the purported name of the person, and/or other identifying information, such as a purported driver's license number for the person, a purported employee number of the person, a purported social security number of the person, or the like. The wireless connection between the facility wireless communications circuit 320 and the mobile device wireless communications circuit 130 may be any suitable wireless connection, including BLUETOOTH™ or WIFI™, or a link through a cellular telephone network.

The mobile device control circuit 120 may include a processing circuit running a piece of software, or an "application" that causes the processing circuit to execute certain tasks, including reading data from the motion sensing instrument 115, transmitting the motion data to the facility access control circuit 315, and receiving instructions and relaying them to the person, such as an instruction to stop walking (discussed in further detail below).

After receiving the motion data, the facility access control circuit 315 determines, based at least in part on the motion data, whether the person is authorized to enter the facility 305, and, accordingly, controls or instructs the barrier 310 to grant or deny the person access to the facility 305.

In one embodiment, the identity of the approaching person (the person approaching the barrier) is authenticated and validated in part by comparing the motion data received from the mobile device 110 (as the person approaches the barrier) to motion data previously recorded for a person whom the approaching person purports to be. The comparison may result in a number that is a measure of the extent to which the motion data received and the previously recorded motion data differ (i.e., a measure of any differences between the motion data received and the previously recorded motion data), and it may be compared to a threshold to determine whether or not the motion data received and the previously recorded motion data are deemed to match.

The comparison of the motion data received and the previously recorded motion data may be performed, for example, by fitting each with a parameterized model and comparing the respective sets of parameter values that result from the respective fitting operations. Accordingly, sets of gait characteristics for various people may be stored in the server 325. Each of these sets of gait characteristics may be, for example, a time record of motion data (recorded while the person was walking) or a vector of parameter values in a parameterized walking gait model.

A parameterized walking gait model may be based on the physics of walking, or it may be empirically formed from gait characteristic measurements obtained for different people. A model based on the physics of walking may have as parameters, for example, a parameter for the lengths of the femur, a parameter for the length of the tibia, a parameter for the pitch flexibility of the ankle, and parameters characterizing the magnitude and timing of contractive forces provided by each of the major muscles or muscle groups involved, e.g., the quadriceps, the biceps femoris, the gastrocnemius, and the like. In some embodiment the model may accommodate an asymmetrical gait, with, for example, two parameters for femur length, to accommodate the possibility that the femurs are not the same length. In some embodiments one parameter may be the height of the person, and other length parameters may be scaled to the height.

Various methods may be used to compare measured gait characteristics to determine whether a set of gait characteristic data being classified matches a set of reference gait characteristics (the set of reference gait characteristics being ones previously obtained, for example, stored on the server, and known to be those of a particular person). In one embodiment, a time record of motion data is first processed to remove or reduce the influence of circumstances that are not relevant for authentication and validation. Such circumstances may include, for example, whether the mobile device was being carried right side up or upside down in a pocket of the person carrying it when the motion data were obtained.

For example, a method for removing the effect of whether the mobile device was being carried right side up or upside down may include averaging acceleration data within the motion data over an interval of time to identify, in the frame of reference of the motion sensing instrument 115, and designating the direction as "down". It may further include averaging velocity data from the GPS receiver 230, and designating the direction as "forward". A modified or "pre-processed" time record of motion data may then be formed, in which each vector quantity (e.g., acceleration) is represented by its components along the down direction, the forward direction, and, e.g., a "cross" direction perpendicular to both the down and forward directions. In some embodiments, a best-fit parameter vector is then found, that results in a motion profile that fits the pre-processed time record.

In some embodiments, the server stores a database including for each of a number of people, identifying information (e.g., an employee number) and reference gait characteristics. When the facility access control circuit 315 receives purported identifying information and a time record of motion data, it retrieves the reference gait characteristics for the person identified by the purported identifying information, and compares the reference gait characteristics to the gait characteristics of the received motion data. If the gait characteristics of the received motion data match the reference gait characteristics, the facility access control circuit 315 may deem the purported identifying information to have been authenticated. In some embodiments, validation of the received motion data may also take place using a model of reasonable gait activity. Such a model may for example be a physics model that may analyze the received motion data to determine whether the gait is reasonable. In such an embodiment the received motion data may be both authenticated and validated.

Received motion data may be compared to reference motion data by fitting each with the parameterized model to obtain two respective parameter vectors. A vector distance may then be calculated, providing a measure of the extent to which the two vectors are different. The vector distance may be, for example, the sum of the squares of the element-by-element (i.e., parameter by parameter) differences, or the square root of this sum, or the sum of the absolute values of the element-by-element (i.e., parameter by parameter) differences or the maximum of the absolute values of the element-by-element (i.e., parameter by parameter) differences. The vector distance may then be compared to a threshold; if the difference is less than the threshold, the received gait characteristics may be deemed to match the set of reference gait characteristics.

In some embodiments the time record of motion data may be segmented, e.g., into a plurality of segments each containing 500 points in time. Each segment may then be separately compared to the set of reference gait characteristics, and a corresponding plurality of vector distances may be obtained. The smallest vector distance may be compared to the threshold to determine whether the set of gait characteristic data being classified matches the set of reference gait characteristics, or outliers (e.g., vector distances exceeding twice the mean vector distance) may be discarded, and the mean of the remaining vector distances may be compared to the threshold, to determine whether the set of gait characteristic data being classified matches the set of reference gait characteristics. In this manner, if the time record of motion data include an anomaly, e.g., a temporary change in the walking gait of the person due to an irregularity in the terrain, the gait may nonetheless be correctly recognized.

The set of reference gait characteristics may be obtained by a process that may be referred to as "training" in which a person's identity is authenticated and validated by some method (e.g., by the use of identifying documents such as a passport or badge), and the person then walks while carrying a motion sensing instrument 115 (e.g., while carrying the mobile device 110). Data may be obtained while the person walks some distance, e.g., while the person takes a large number of steps, to obtain an assessment of the amount of natural variation in the person's gate. Multiple sets of reference gait characteristics may be obtained, respectively, for various carrying positions of the mobile device 110. For example, one set being obtained while the mobile devices 110 is in the person's front pants pocket, another set being obtained while the mobile devices 110 is in the person's rear pants pocket, and another set being obtained while the mobile devices 110 is in the person's shirt pocket. In this case, a subsequent match of set of gait characteristic data being classified against one of these sets of reference gait characteristics may suffice to authenticate the person's purported identifying information.

Various measures may be taken to enhance the security of the system, i.e., to reduce its vulnerability to defeat by an adversary, not authorized to access the facility 305, who seeks to access the facility 305. In some embodiments data transmitted by the mobile device control circuit 120 to the facility access control circuit 315 are cryptographically signed, e.g., using a public key infrastructure (PKI). For example, a mobile device token (that is in the possession of both the mobile device 110 and the facility access control circuit 315) may be encrypted with a first private key by the mobile device control circuit 120. If the decryption, using a corresponding first public key, of the encrypted data, by the facility access control circuit 315, produces a decrypted result matching the unencrypted mobile device token, this result confirms to the facility access control circuit 315 that the sender of the encrypted data is in possession of the private key.

Figure 4:
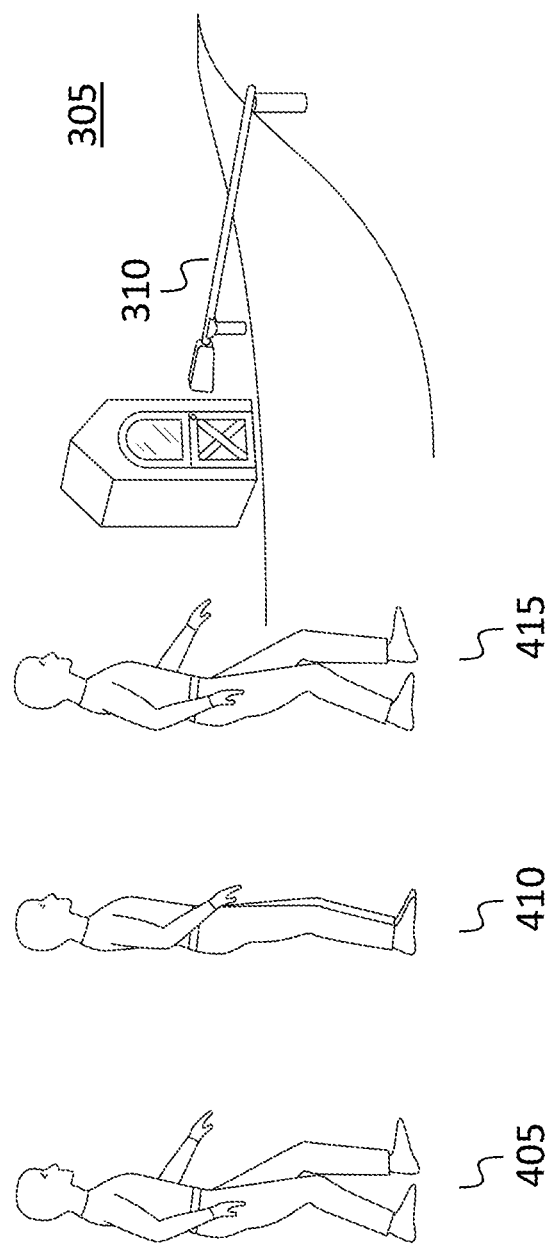
FIG. 4 is a hybrid flow chart and perspective view of a person approaching a facility to which the person seeks to gain access, according to an embodiment of the present invention.

Referring to FIG. 4, in some embodiments the facility access control circuit 315 may instruct the person to stop for some interval of time and then to begin walking again. In an act 405, the person begins walking on instructions from the facility access control circuit 315 (e.g., through the mobile device 110), in an act 410, the person pauses, or stops walking, again on instructions from the facility access control circuit 315, and in an act 415, the person begins walking again, on instructions from the facility access control circuit 315. The received time record of motion data may then be analyzed to verify that it includes an interval of reduced motion, or negligible motion (e.g., motion having root-mean-square (RMS) acceleration that is less than 10% of an RMS acceleration measured while walking), corresponding to the interval of time during which the person was instructed to stop. The instruction to stop may be communicated to the person through the mobile device 110, which may produce an audio signal (e.g., replay a recorded voice) commanding the person to "stop walking" and, later to "begin walking". In some embodiments the facility 305 may include a loudspeaker or an electrical sign outside of the barrier 310 for communicating these commands to the person. The use of this method may provide obstacles to an adversary attempting a "replay attack", i.e., an adversary who may have obtained recorded motion data for, and who may wish to impersonate, a person who is authorized to access the facility. Simply transmitting the recorded motion data would fail in this situation because it would not contain an interval of reduced motion, or negligible motion, corresponding to the interval of time during which the person was instructed to stop.

In some embodiments, the set of reference gait characteristics may not be stored in the facility 305, and the risk of these data being used or accessed in a manner not authorized by the person whose walking gait they represent may be reduced. The set of reference gait characteristics may instead by stored, in the data storage element 125 of the mobile device 110, encrypted, e.g., with Diffie-Hellman encryption. The encrypted data may include both the set of reference gait characteristics and some identifying information for the person whose walking gait they represent. In such an embodiment, when the person seeks to access the facility, the mobile device 110 may transmit the encrypted data along with the motion data, and the purported identifying information. The facility access control circuit 315 may decrypt the encrypted data to obtain the set of reference gait characteristics, and the identity of the person whose walking gait they represent, and may then authenticate the purported identifying information if at least (i) the received motion data match the set of reference gait characteristics, and (ii) the purported identifying information match the identifying information for the person whose walking gait the set of reference gait characteristics represent. As mentioned above, the facility access control circuit 315 may require other conditions to be met, such as that the motion data contain an interval of reduced motion, or negligible motion, corresponding to the interval of time during which the person was instructed to stop, or such as requiring that some data received from the mobile device 110 be cryptographically signed.

In some embodiments the facility 305 further includes a detector 330 on the outside of the barrier (e.g., between 50 m and 100 m from the barrier) that detects the presence of any person walking toward the barrier 310. The detector 330 is connected to the facility access control circuit 315. When the detector 330 notifies the facility access control circuit 315 that a person is approaching, the facility access control circuit 315 sends a signed facility token (i.e., a facility token, encrypted with a second private key that is part of a public key infrastructure (PKI)) to the mobile device control circuit 120, through the mobile device wireless communications circuit 130. The wireless communications circuit 130 is in possession of a second public key for the public key infrastructure and of the unencrypted value of the facility token. It decrypts the encrypted facility token and compares the decrypted result to the unencrypted value of the facility token, and disregards the received encrypted token if they do not match. A match between the decrypted result and the unencrypted value of the facility token triggers the wireless communications circuit 130 to begin gathering gait or stride related data. As the triggering access point is at some distance (50 m-100 m) from the barrier 310, sufficient motion data may be gathered to characterize the walk of the person carrying the device.

In some embodiments, the wireless communications circuit 130 encrypts the motion data based on the facility token, before sending the encrypted motion data to the facility access control circuit 315. For example, the encryption may use the facility token as a seed or partial key for the encryption algorithm. In such an embodiment, the token acts as a logical password for the system, e.g., the token is part of a seed that is used for the randomization of the data that is the process of encryption. The facility token may be a rolling token, such as may be supplied by a hardware security token having a rolling digit associated with a person. Alternatively, there may be a facility certificate or public key on the mobile device 110.

In some embodiments, if the person's identity is validated based on the person's walking gait, the person may then present additional credentials at the barrier, such as a badge or a personal identification number (PIN). If the additional credentials match with the identity determined by the gait analysis using the data from the smart device, the user is permitted to proceed.

The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Although limited embodiments of a method and apparatus for authentication and validation of persons using gait data have been specifically described and illustrated herein, many modifications and variations will be apparent to those skilled in the art. Accordingly, it is to be understood that a method and apparatus for authentication and validation of persons using gait data employed according to principles of this invention may be embodied other than as specifically described herein. The invention is also defined in the following claims, and equivalents thereof.

What is claimed is:

1. A method for identifying a person, the method comprising:
   instructing the person to walk, if the person is not already walking;
   instructing the person to stop during an interval of time;
   instructing the person to begin walking again;
   receiving a time record of motion data generated by a motion sensing instrument carried by the person;
   determining whether a measure of any differences between: the time record of motion data, and previously recorded motion data is less than a first threshold; and
   determining whether the time record of the motion data includes a segment, corresponding to the interval of time, within which an amount of motion is less than a second threshold, the second threshold being 10% or less of a root-mean-square acceleration measured during a segment of the time record not corresponding to the interval of time;
   receiving purported identifying information for the person
   granting access to a facility when: the received purported identifying information matches identifying information for a person for whom the previously recorded motion data was recorded and who is authorized to access the facility;
   the measure of any differences between:
      the time record of motion data, and
      the previously recorded motion data
   is less than the first threshold; and
   the time record of the motion data includes a segment, corresponding to the interval of time, within which an amount of motion is less than the second threshold.

2. The method of claim 1, wherein the receiving of the time record of motion data comprises receiving an encrypted time record of motion data.

3. The method of claim 1, wherein the receiving of the time record of motion data comprises receiving a cryptographically signed time record of motion data.

4. The method of claim 3, wherein the receiving of the cryptographically signed time record of motion data comprises receiving a time record of motion data cryptographically signed utilizing a public key infrastructure (PKI).

5. The method of claim 1, wherein the motion sensing instrument comprises a plurality of sensors.

6. The method of claim 5, wherein the plurality of sensors comprises an accelerometer.

7. The method of claim 6, wherein the plurality of sensors further comprises a rotation sensor.

8. The method of claim 1, wherein the determining of whether a measure of any differences between: the time record of motion data, and previously recorded motion data is less than a first threshold comprises:
   fitting a parameterized model to the time record of motion data to obtain a first vector of parameter values
   fitting the parameterized model to the previously recorded motion data to obtain a second vector of parameter values; and
   calculating a vector difference between the first vector and the second vector.

9. The method of claim 8, wherein the calculating of the vector difference between the first vector and the second vector comprises finding the largest one of a set of absolute values of element-by-element differences between the first vector and the second vector.

10. A system for authenticating the identity of a person, the system comprising:
a controllable barrier for controlling access to a facility;
a facility control circuit; and
a mobile device comprising:
a motion sensing instrument;
a mobile device control circuit; and
a wireless communications circuit;
the mobile device control circuit being configured to:
instruct a person carrying the mobile device to begin a first interval of walking, if the person is not already walking, instruct the person to stop during an interval of time;
instruct the person to begin a second interval of walking;
receive a plurality of signals from the motion sensing instrument;
generate a time record of motion data from the received signals; and
transmit the time record of motion data through the wireless communications circuit to the facility control circuit, wherein the facility control circuit is configured to determine whether the time record of the motion data includes a segment, corresponding to the interval of time, within which an amount of motion is less than a second threshold, the second threshold being 10% or less of a root-mean-square acceleration measured during a segment of the time record not corresponding to the interval of time;
wherein the facility control circuit is further configured to:
open the controllable barrier when:
a measure of any differences between:
the time record of motion data, and
previously recorded motion data
is less than a first threshold; and
the time record of the motion data includes a segment, corresponding to the interval of time, within which an amount of motion is less than the second threshold.

11. The system of claim 10, wherein the mobile device control circuit is further configured to, before instructing the person to begin the first interval of walking:
receive an encrypted token through the wireless communications circuit;
decrypt the encrypted token to form a decrypted token; and
compare the decrypted token to a reference token stored in the mobile device.

12. The system of claim 10, wherein the mobile device control circuit is further configured to encrypt the time record of motion data to form an encrypted time record of motion data, and wherein the transmitting of the time record of motion data comprises transmitting the encrypted time record of motion data.

13. The system of claim 12, further comprising:
a controllable barrier for controlling access to a facility;
the facility control circuit being further configured to:
receive the encrypted time record of motion data;
decrypt the encrypted time record of motion data to form a decrypted time record of motion data; and
determine whether a measure of any differences between:
the time record of motion data, and
previously recorded motion data
is less than a first threshold.

14. The system of claim 13 wherein:
the mobile device control circuit is further configured to encrypt a mobile device token with a private encryption key to form an encrypted mobile device token, and
the facility control circuit is further configured to:
decrypt the encrypted mobile device token to form a decrypted mobile device token; and
determine whether the decrypted mobile device token is the same as a reference token stored in the facility.

15. The system of claim 14, wherein the facility control circuit is further configured to:
open the controllable barrier when:
the measure of any differences between:
the time record of motion data, and
previously recorded motion data
is less than the first threshold;
the time record of the motion data includes a segment, corresponding to the interval of time, within which an amount of motion is less than the second threshold; and
the decrypted mobile device token is the same as the reference token.

* * * * *